Aug. 11, 1942.   E. P. DE CRAENE   2,292,622
GLAND BOLT CLAMP RING FOR VALVES
Filed Oct. 10, 1941   2 Sheets-Sheet 1
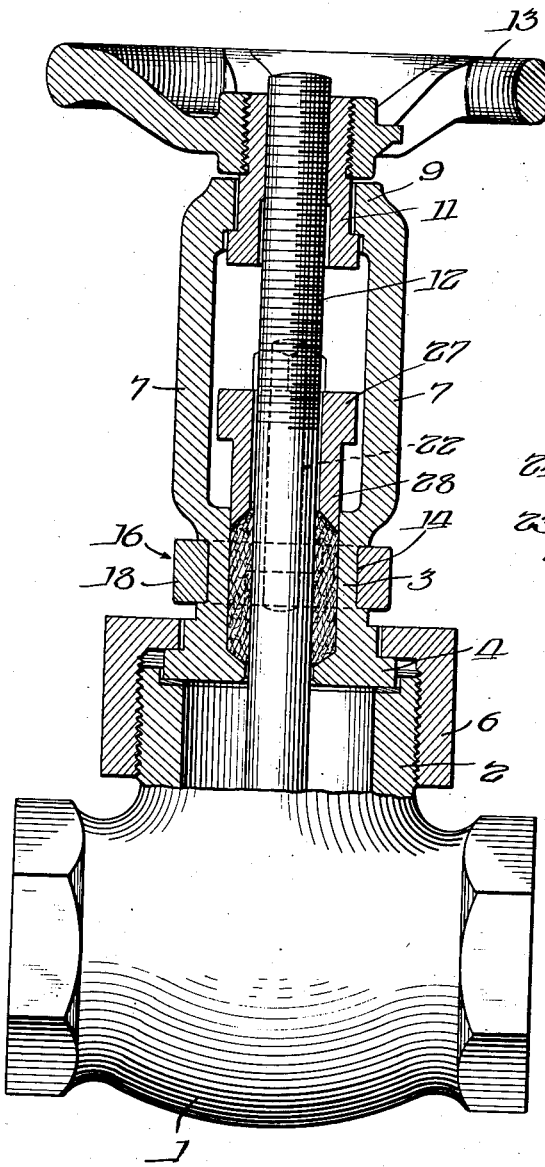
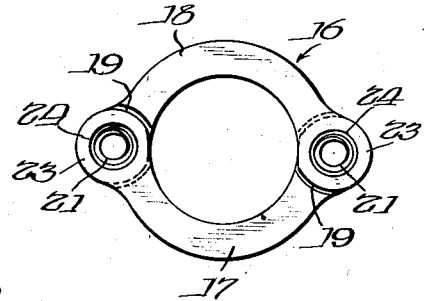
Inventor:
Edmond P. De Craene
By Joseph O. Lange Atty.

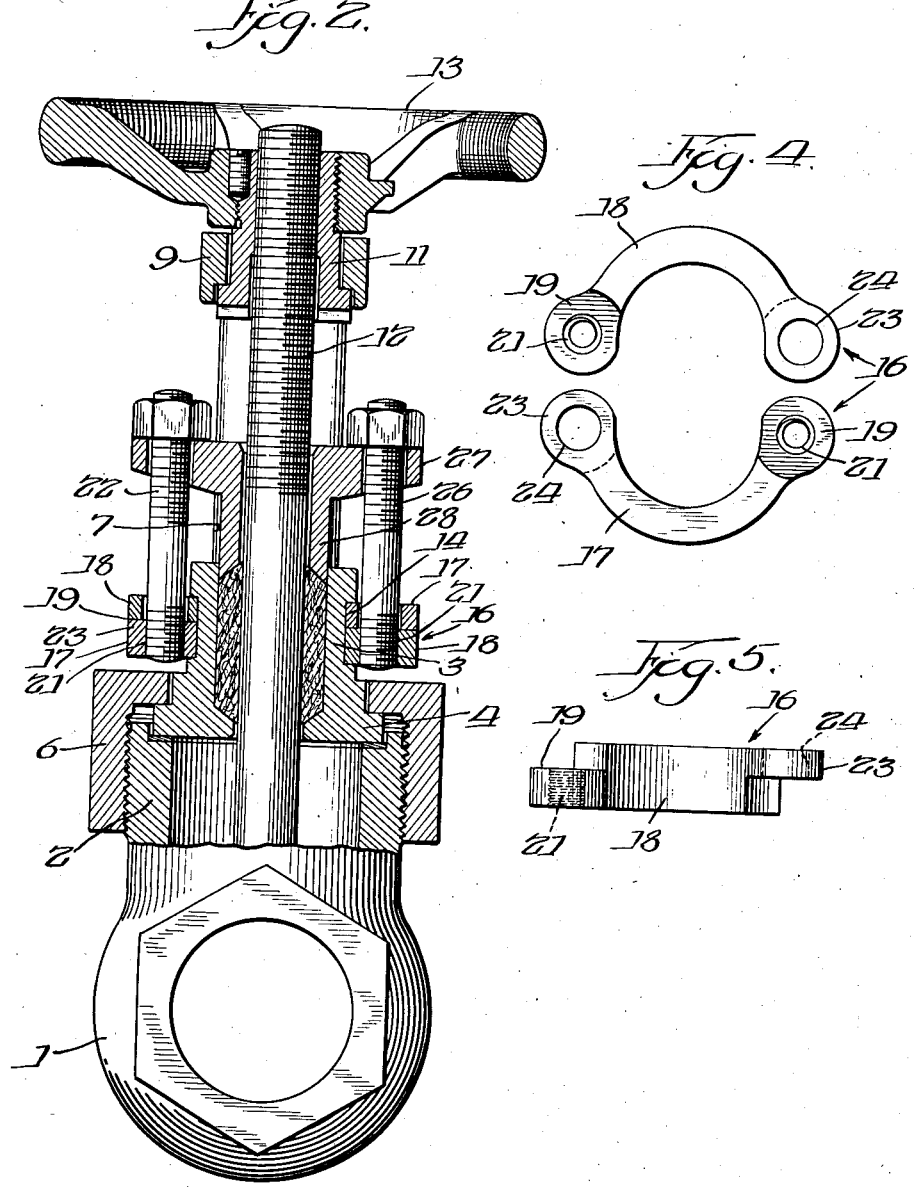

Patented Aug. 11, 1942

2,292,622

UNITED STATES PATENT OFFICE 2,292,622

GLAND BOLT CLAMP RING FOR VALVES

Edmond P. De Craene, Chicago, Ill., assignor to Crane Co., Chicago, Ill., a corporation of Illinois Application October 10, 1941, Serial No. 414,423

1 Claim. (Cl. 251—50)

This invention relates to valves and more particularly to a new and improved gland bolt clamp ring for valves. It has for one of its principal objects the provision of a novel valve construction that enables valves of the conventional union bonnet type to be conveniently assembled prior to the application of the gland bolt clamp ring thereby permitting a union nut to be applied to valves otherwise considerably incapable of such assembly.

An important object of this invention is to provide a two-piece gland bolt clamp ring construction wherein the gland bolts in addition to adjustably supporting the gland flange and aiding to compress the stuffing box packing, function also to unite the two-piece clamp ring into a relatively sturdy unitary element.

Another important object of this invention lies in the provision of a union bonnet valve wherein the bonnet has an annular recessed portion therearound for the reception of a two-piece gland bolt clamp ring to provide rebated joints at their intersections.

A further important object of this invention is to provide a two-piece clamp ring for gland bolts of valves wherein the two semi-circular pieces are identical, thus making manufacture of the same relatively more economical.

Other and further important objects will become apparent from the disclosures in the following specification and the accompanying drawings, in which:

Fig. 1 is a vertical longitudinal sectional assembly view through the center of a valve constructed in accordance with this invention.

Fig. 2 is a vertical sectional view taken at right angles to that of Fig. 1.

Fig. 3 is a plan view of the novel clamp bolt ring in assembled position.

Fig. 4 is a plan view of the clamp bolt rings in separated or disasssembled position.

Fig. 5 is an end view of one of the sections forming the clamp bolt ring.

As shown in Fig. 1, the reference numeral 1 indicates generally the conventional valve body having a threaded bonnet connecting or casing upper portion 2. The bonnet comprises a sleevelike member 3, one end of which is flanged as at 4 to provide an attaching means to be secured to the end surface of the bonnet connection 2 by means of the usual union nut or ring 6. The upper part of the bonnet 3 is equipped with preferably integral, upwardly extending yoke arms 7 which converge to form the annular ring portion 9 for engagement by the flanged bushing 11, the latter member being internally threaded for reception of the stem 12 of the valve in order to effect the usual reciprocal motion of the stem 12 upon rotation of the bushing 11 by the handwheel 13 when it is desired to open or close the valve. The lower sleeve portion 3 of the bonnet is provided with an annularly extending groove 14 which receives a divided clamp ring 16, the latter member when assembled being mounted within the groove 14 to serve as a support for the gland bolt studs and the gland flange.

As best shown in Fig. 2, the novel clamp ring 16 constituting my invention is preferably, but not necessarily, composed of two substantially semi-circular rings 17 and 18 identical in form and size as shown in detail in Figs. 3, 4 and 5. Each of the clamp rings 17 and 18 is provided with enlarged end portions, as indicated. One end of each of the semi-circular clamp rings has the upper portion of one of its enlarged ends removed as shown at 19 in Figs. 4 and 5. The lower enlarged end portion of each of the clamp ring portions 17 and 18, as best shown in Fig. 2, is threaded at 21 for the purpose of engaging the gland bolt 22. The semi-circular clamp ring portion 17 is adapted to oppositely join with the clamp ring 18 as more clearly shown in Fig. 4, to form the assembly shown in Fig. 3. In further explanation, the end of the clamp ring 17 that joins with the end portion 19 of the ring 18 has its lower portion recessed with the upper enlarged end portion 23 superposed upon the end portion 19 of the ring 18 to thus form a rebated joint. The end portion 23 of the ring 17 is provided with an aperture 24, sufficiently large to permit the gland bolts 22 to pass therethrough to threadedly engage the tapped aperture 21 of the end portion 19 of the clamp ring 18. As previously stated, the clamp ring portions 17 and 18 are identical in shape and size, hence the opposite intersection of the clamp rings 17 and 18 supports the gland bolt 26 in the same manner as heretofore described.

The gland bolts 22 and 26 extending through an aperture thereof, engage the gland flange 27 provided with the depending packing gland 28. Thus it is apparent that the gland bolts 22 and 26 perform two functions, namely that of serving as pivotal points and securing the clamp rings 17 and 18 together, in addition to engaging the gland flange 27 to compress the stuffing box packing.

Heretofore clamp rings used in valves of this type of necessity have used means other than the gland bolts to secure the semi-circular clamping elements together. Elimination of the independent clamping means heretofore employed has been instrumental in producing a simple and more economical gland bolt clamp ring construction.

Obviously, many changes may be made in the details of construction without departing from the spirit and scope of this invention as defined in the claim appended hereto.

I claim:

In a valve construction, a body member, a bonnet having a yoke composed of a pair of spaced arms terminating in a valve stem guide, the said bonnet being provided with an annular groove, a union nut connecting said bonnet to said body, a gland disposed between the arms of said yoke, means for securing the said gland in position comprising a two-piece collar positioned within the groove of the said bonnet, bolts secured to the two-piece collar and serving to assemble the said collar into a single unitary annular element, the said two-piece collar comprising a pair of identical substantially semi-circular rings forming opposite rebated joints wherein the lower projections forming the joints have threaded apertures therethrough and the upper projections forming the rebated joints having enlarged apertures therethrough whereby the said bolts are positioned substantially close to the peripheral limits of the bonnet and extend through the upper projections to threadedly engage the lower projections of the said semi-circular rings to hold the said collar upon the said bonnet.

EDMOND P. DE CRAENE.